July 13, 1965     J. L. WILLIAMS     3,194,269

TWO WAY SHUT OFF VALVE

Filed Dec. 19, 1962

JOHN L. WILLIAMS
INVENTOR.

BY
BUCKHORN, BLORE, KLARQUIST & SPARKMAN
ATTORNEYS 3,194,269
TWO WAY SHUT OFF VALVE
John L. Williams, 17467 NE. West View Road,
Oswego, Oreg.
Filed Dec. 19, 1962, Ser. No. 245,901
6 Claims. (Cl. 137—614.11)

This invention relates to gate valves of the blade type and particularly to a fabricated two way shut off valve of such type.

The ordinary gate valve will leak very little, or not at all, when subjected to pressure on one side of the gate blade, but will leak a substantial amount when subjected to pressure on the opposite side thereof.

Many blade type gate valves are installed in places where they are required to seal in only one direction, and thus in such places they function satisfactorily. However, in other installations, sealing in both directions is required, and thus ordinary blade type gate valves cannot be used successfully in such places.

At the present time, gate valves of more complicated and expensive construction are utilized, and where they employ a gate blade, they also utilize complicated devices for sealing purposes.

Even when these more complicated valves prove successful in handling ordinary liquids, they are frequently not satisfactory for handling paper stock, because the stock accumulates in or around and causes malfunction of the sealing devices. Or, the stock is trapped temporarily in pockets or chambers and is subsequently released to have an adverse effect on the concentration of the stock passing through the valve.

It is a main object of the present invention to provide a gate valve utilizing simple gate blades for attaining two way shut off.

Another object is to provide such a valve that will successfully handle paper stock without malfunctioning and without adversely affecting the stock concentration.

Various other objects of the invention will be apparent from the following description taken in connection with the accompanying drawings wherein.

Figure 1:
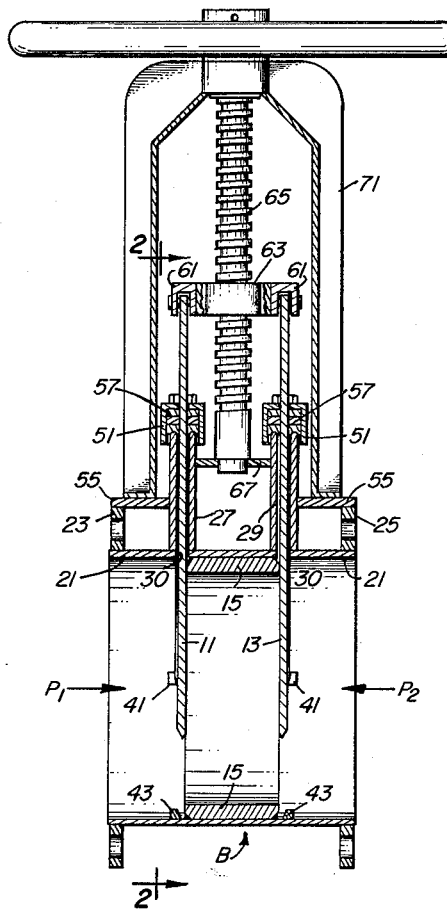
FIG. 1 is a vertical mid-sectional view through a gate valve of the present invention.

Referring to the drawings, the valve comprises a body B slidably receiving a pair of gate blades 11 and 13 which sealingly engage the opposite ends of a tubular seat member 15 to provide two way shut off.

Figure 2:
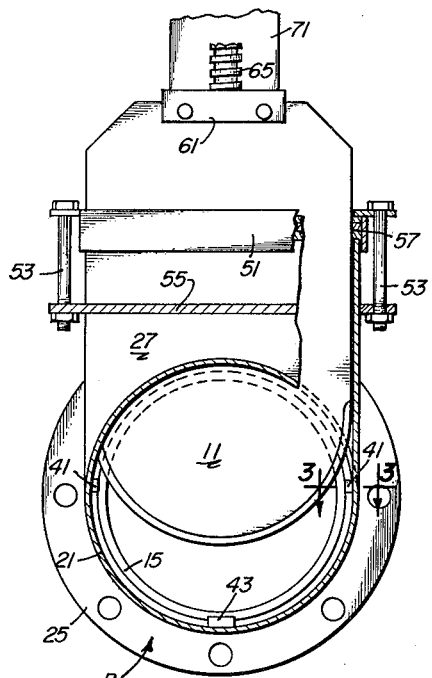
FIG. 2 is a vertical sectional view of the valve taken along line 2—2 of FIG. 1, with certain parts broken away for convenience in illustration.
Figure 3:
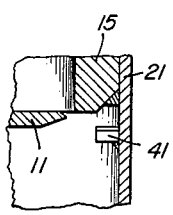
FIG. 3 is a fragmentary horizontal sectional view taken along line 3—3 of FIG. 2.

More in particular, the body B includes a cylindrical flow passage member 21 equipped at its ends with bolting flanges 23 and 25. The body B has a pair of parallel spaced chests 27 and 29 having curved lower ends (FIG. 2) secured to the member 21 and communicating with the interior of the passage member 21 through slots 30 formed in the latter and registering with the chests.

The seat member 15 fits within and is fixedly secured to the interior of the flow passage member 21 at a place between the slots 30. The end portions of the seat member project beyond the edges of the member 21 that define the inner walls of the slots, but terminate short of the edges of the member 21 that define the outer walls of the slot whereby the seat member 15 provides a pair of circular seats at its end faces. Thus such end portions can engage the blades 11 and 13 which pass through the chests 27 and 29 and the slots 30 into the flow passage member 21.

Each blade has a semicircular lower end which has a primary bevel 33 on the outer side thereof, and a secondary and minor bevel on the inner side thereof. Since the seat member 15 is of cylindrical form, and since each of the blades 11 and 13 has a width only slightly less than that of the external diameter of the seat member 15, it is apparent that in the closed positions of the gate blades, the curved edges of the blades are substantially concentric with the lower half of the seat member 15.

Two pairs of side camming lugs 41 (FIGS. 1 and 2) are secured to the interior of the passage member 21 in positions to engage the outer side margins of the blades 11 and 13 during the last increment of closing movement of the blades to force the midportions of the blades tightly against the seat member 15.

A pair of bottom lugs 43 are secured to the interior of the flow passage member 21 in positions to engage the bottom central edges of the gate blades 11 and 13, during the last increment of closing movement thereof, to cam the lower portions of the gate blades tightly against the seat member 15.

When the blades 11 and 13 are in their fully closed positions, it is apparent that pressure $P_1$ on the left as indicated in FIG. 1 will be taken by the blade 11 on its outer face and thus an effective seal will be formed between the blade 11 and the seat member 15 because the pressure $P_1$ is forcing the blade 11 against its seat rather than away from its seat. Thus there will be little or no leakage past the blade 11 and thus the blade 13 will not be subjected to pressure on its inner face.

If there is a pressure $P_2$ on the right as indicated in FIG. 1, the pressure will be effective against the outer face of the blade 13, which will be forced by such pressure even more tightly against its seat on seat member 15. Thus, an effective seal against leakage to the left will be provided.

It is apparent from the above that two way shut off is achieved with simple blades and without complicated and expensive sealing devices. Furthermore, the simple common seat member 15 has a smooth uninterrupted surface between the blades which is without pockets or crevices which could cause malfunctioning of the seat member or adversely affect the concentration of stock flowing through the valve.

Inverted type packing assemblies of the type shown in my Patent Re. 24,735 slidably receive the blades 11 and 13 and are mounted on the upper ends of the chests 27 and 29. These assemblies provide for lateral adjustment of each blade so that both blades may be positioned for concurrent engagement with the opposite ends of the seat member 15.

Each assembly includes an inverted box 51 adjustably mounted by a pair of bolts 53 (FIG. 2) on a flange 55. There are two flanges 55 which are secured to the chests 27 and 29 and the bolting flanges 23 and 24 (FIG. 1). Each box 51 carries packing 57 for sealing engagement with the upper edges of the associated chest. The bolts 53 pass through oversize slots in the box 51 as is apparent from FIG. 2 to enable the blades to be laterally adjusted when the bolts are loosened, whereby to facilitate concurrent engagement of the blades with the seats provided by the seat member 15.

The upper ends of the blades 11 and 13 are pivotally connected to clevises 61 provided by a nut 63. A screw or stem 65 threadedly passes through the nut and has its lower end rotatably received by a journal plate 67. The latter is secured to the chests 27 and 29.

The upper end of the stem is rotatably connected to a yoke 71 which has its lower ends mounted on the flanges 55. A handwheel is secured to the upper end of the stem 65 to enable rotation thereof and thus effect simultaneous raising or lowering of the blades 11 and 13.

Having described the invention in what is considered to be the preferred embodiment thereof, it is desired that it be understood that the invention is not to be limited other than by the provisions of the following claims.

I claim:
1. A gate valve having
  a body which includes a cylindrical member,
  said member being formed with parallel circumferential slots,
  a pair of parallel laterally spaced gate blades having semicircular end portions projecting through said slots into said member,
  a second cylindrical member having an exterior diameter just less than the interior diameter of said first member and slidably fitting into said member to occupy a position between said blades,
  said blades being laterally adjustable,
  said second cylindrical member having a width greater than the minimum spacing between said blades but less than the maximum spacing between said blades to provide for concurrent engagement of said blades with said second member.

2. A gate valve having
  a body which includes a cylindrical member,
  said member being formed with parallel circumferential slots,
  a pair of parallel laterally spaced gate blades having semicircular end portions projecting through said slots into said member,
  a second cylindrical member having an exterior diameter just less than the interior diameter of said first member and slidably fitting into said member to occupy a position between said blades,
  said blades being laterally adjustable,
  said second cylindrical member having a width greater than the minimum spacing between said blades but less than the maximum spacing between said blades to provide for concurrent engagement of said blades with said second member,
  said second member being a unitary one-piece element having its outer corners cut away,
  and welds between such outer corners and said first member.

3. A gate valve having
  a body which includes a cylindrical member,
  said member being formed with parallel circumferential slots,
  a pair of parallel laterally spaced gate blades having semicircular end portions projecting through said slots into said member,
  a second cylindrical member having an exterior diameter just less than the interior diameter of said first member and slidably fitting into said member to occupy a position between said blades,
  said blades being laterally adjustable,
  said second cylindrical member having a width greater than the minimum spacing between said blades but less than the maximum spacing between said blades to provide for concurrent engagement of said blades with said second member,
  said second member being a unitary one-piece element having its outer corners cut away,
  welds between such outer corners and said first member,
  and common gate blade moving means connected to said blades for simultaneously moving said blades.

4. A gate valve having
  a body which includes a cylindrical member,
  said member being formed with parallel circumferential slots,
  a pair of parallel laterally spaced gate blades having semicircular end portions projecting through said slots into said member,
  a second cylindrical member having an exterior diameter just less than the interior diameter of said first member and slidably fitting into said member to occupy a position between said blades,
  said blades being laterally adjustable,
  said second cylindrical member having a width greater than the minimum spacing between said blades but less than the maximum spacing between said blades to provide for concurrent engagement of said blades with said second member,
  said second member being a unitary one-piece element having its outer corners cut away,
  welds between such outer corners and said first member,
  and common gate blade moving means connected to said blades for simultaneously moving said blades,
  the radius of curvature of said curved blade end portions being substantially equal to the mean radius of curvature of said second member.

5. A gate valve having
  a body which includes a cylindrical member,
  said member being formed with parallel circumferential slots,
  a pair of parallel laterally spaced gate blades having semicircular end portions projecting through said slots into said member,
  a second cylindrical member having an exterior diameter just less than the interior diameter of said first member and slidably fitting into said member to occupy a position between said blades,
  said blades being laterally adjustable,
  said second cylindrical member having a width greater than the minimum spacing between said blades but less than the maximum spacing between said blades to provide for concurrent engagement of said blades with said second member,
  said second member being a unitary one-piece element having its outer corners cut away,
  welds between such outer corners and said first member,
  and common gate blade moving means connected to said blades for simultaneously moving said blades,
  the radius of curvature of said curved blade end portions being substantially equal to the mean radius of curvature of said second member,
  said second member providing a smooth uninterrupted surface between said blades to avoid hang-up or collection of stock.

6. A gate valve having,
  a body which includes a first cylindrical member,
  said member being formed with parallel circumferentially extending slots which are defined in part by inner and outer edges of said first cylindrical member,
  a pair of parallel laterally spaced gate blades having semicircular end portions projecting through said slots into said member,
  a second cylindrical member having an exterior diameter just less than the interior diameter of said first member and fitting into said member and secured therein to occupy a position between said blades,
  said second cylindrical member having a width such that the end portions thereof project beyond the inner edges of said first cylindrical member, but short of said outer edges of said first cylindrical member to thereby provide a pair of seats for engagement by said blades, said blades concurrently engaging their respective seats, means disposed in said first cylindrical member and next to the outer faces of said blades for engaging said blades and forcing them against said seats, and means for moving said blades into and out of closed position relative to said seat.

References Cited by the Examiner

UNITED STATES PATENTS

| | | | |
|---|---|---|---|
| 940,577 | 11/09 | Barrett | 137—614.11 |
| 1,156,049 | 10/15 | Bopp | 137—614.11 |
| 2,873,943 | 2/59 | Williams | 251—193 XR |
| 2,895,709 | 7/59 | Rattigan | 251—202 XR |
| 2,982,305 | 5/61 | Grove | 137—614.11 |
| 2,982,513 | 5/61 | Krummel | 251—329 XR |

FOREIGN PATENTS 230,259  9/60  Australia.

LAVERNE D. GEIGER, *Primary Examiner.*